(12) United States Patent
Arias-Thode et al.

(10) Patent No.: US 12,510,049 B1
(45) Date of Patent: Dec. 30, 2025

(54) LOW FLOW MICROBIAL FUEL CELL AND HYDRO-KINETIC TURBINE

(71) Applicant: Naval Information Warfare Center (NIWC) Pacific, San Diego, CA (US)

(72) Inventors: Yolanda Meriah Arias-Thode, San Diego, CA (US); Alexander G. Stevens-Bracy, San Diego, CA (US); Bashar Dhurgham Ameen, San Diego, CA (US); Halah S. Ramzi, San Diego, CA (US); Matthew Lanford Bond, San Diego, CA (US)

( * ) Notice: Subject to any disclaimer, the term of this patent is extended or adjusted under 35 U.S.C. 154(b) by 0 days.

(21) Appl. No.: 18/759,638

(22) Filed: Jun. 28, 2024

(51) Int. Cl.
*F03B 17/06* (2006.01)
*F03B 13/10* (2006.01)

(52) U.S. Cl.
CPC ............ *F03B 17/063* (2013.01); *F03B 13/10* (2013.01); *F05B 2220/7064* (2013.01); *F05B 2240/97* (2013.01); *F05B 2250/25* (2013.01)

(58) Field of Classification Search
CPC .............................. F03B 17/063; F03B 13/10; F05B 2220/7064; F05B 2240/97; F05B 2250/25
USPC ....................................................... 290/43, 54
See application file for complete search history.

(56) References Cited

U.S. PATENT DOCUMENTS

| | | | | |
|---|---|---|---|---|
| 1,697,574 A | * | 1/1929 | Savonius | F03D 3/007 416/135 |
| 3,918,839 A | * | 11/1975 | Blackwell | F03D 3/061 416/240 |
| 8,790,069 B2 | * | 7/2014 | Anderson | F03D 9/008 415/905 |
| 8,916,299 B1 | | 12/2014 | Liu et al. | |
| 9,484,589 B1 | | 11/2016 | Hsu et al. | |
| 9,496,577 B2 | | 11/2016 | Arias-Thode et al. | |
| 10,374,235 B2 | | 8/2019 | Chadwick et al. | |
| 11,563,227 B2 | | 1/2023 | Kartalov et al. | |
| 11,563,228 B2 | | 1/2023 | Bond et al. | |
| 11,784,571 B2 | | 10/2023 | Kerber et al. | |
| 2009/0261595 A1 | * | 10/2009 | Poo | F03D 3/02 290/55 |
| 2014/0268931 A1 | * | 9/2014 | Vogel | H02M 7/539 363/40 |

(Continued)

OTHER PUBLICATIONS

ABB Inc., "WRE-113-1 Power Electronics for Hydrokinetics and Fuel Cells", ABB Automation & Power World, Apr. 18-21, 2011.

(Continued)

*Primary Examiner* — Charles Reid, Jr.
(74) *Attorney, Agent, or Firm* — Naval Information Warfare Center, Pacific; Kyle Eppele; Paul C. Oestreich

(57) ABSTRACT

The present invention is an underwater power generation system engineered for operation in a low-flow environment on a seafloor or riverbed. Features of the system include a hybrid Savonius C foil and Darrieus helical foil hydro-kinetic (HK) turbine for primary power generation and a microbial fuel cell (MFC) for secondary power generation. Both power generation sources are secured to a base frame and may be used to charge a rechargeable battery. Anodes from the MFC preferably rest in anoxic sediment on the seafloor or riverbed. The rechargeable battery may be used to power target electrical equipment that may include sensors, data-logging, communications and other electronic functionality operating underwater.

19 Claims, 14 Drawing Sheets

(56) References Cited

U.S. PATENT DOCUMENTS

| | | | |
|---|---|---|---|
| 2015/0249257 A1* | 9/2015 | Liu | H01M 8/16 |
| | | | 429/401 |
| 2018/0291868 A1* | 10/2018 | Moloney | H02K 7/1823 |
| 2020/0106116 A1* | 4/2020 | Bond | H01M 8/2475 |
| 2020/0332764 A1 | 10/2020 | Yu et al. | |
| 2021/0273251 A1 | 9/2021 | Bond et al. | |
| 2022/0252151 A1 | 8/2022 | Zhu et al. | |
| 2023/0052264 A1 | 2/2023 | Kerber et al. | |
| 2023/0382500 A1 | 11/2023 | Arias-Thode et al. | |

OTHER PUBLICATIONS

Babauta et al., "Scaling up benthic microbial fuel cells using flyback converters", Space and Naval Warfare Systems Center Pacific, San Diego, CA, 2018.

Birjandi et al., "Wake Measurement Behind a Loaded Vertical Axis Hydrokinetic Turbine in Field Test", IEEE Xplore, 978-1-4799-8736-8/15, 2015.

Girguis et al., Fundamentals of Benthic Microbial Fuel Cells: Theory, Development and Application, In Bioelectrochemical Systms., 1st edition, Springer Verlag Press, 2010.

Guerra et al., "Wake measurements from a hydrokinetic river turbine", Elsevier, Renewable Energy, vol. 139, pp. 483-495, 2019.

Maldar et al., "A Review of the Hybrid Darrieus-Savonius Turbine for Hydrokinetic Applications", 2021 Third International Sustainability and Resilience Conference.

Polagye, et al., "Tidal energy resource characterization . . . ", Proceedings of the Institution of Mech. Eng., Journal of Power and Energy, vol. 227, Issue 3, pp. 352-367, 2013.

Saini et al., "Numerical Investigations on Hybrid Hydrokinetic Turbine for Electrification in Remote Area", ResearchGate, Conference Paper, Oct. 2018.

Umar et al.,"Insights into Advancements and Electrons Transfer Mechanism of Electrogens in Benthic Microbial Fuel Cells", MDPI, Membranes 2020, 10, 205, Aug. 28, 2020.

\* cited by examiner

LOW FLOW MICROBIAL FUEL CELL AND HYDRO-KINETIC TURBINE

FEDERALLY SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice: (619) 553-5118; email: NIWC_Pacific_T2@navy.mil. Reference Navy Case Number 211380.

CROSS-REFERENCE TO RELATED APPLICATIONS

This US Patent Application is related to U.S. patent application Ser. No. 17/824,799 filed May 25, 2022, titled: "SPLIT RELEASE BENTHIC LANDER", Navy Case Number 211090, issued, Sep. 2, 2025, as U.S. Pat. No. 12,403,987 B2; and U.S. patent application Ser. No. 17/388,135, filed, Jul. 29, 2021, titled: "ELECTRICAL NETWORK WITH FLYBACK ENERGY HARVESTING DEVICE", Navy Case Number 112480, issued, Oct. 10, 2023, as U.S. Pat. No. 11,784,571 B2. The contents of the above patent applications are hereby incorporated by reference for all purposes as if fully set forth herein.

BACKGROUND OF THE INVENTION

Field of the Invention: The present invention relates generally to underwater microgrids for generating power. More particularly, the present invention relates a low flow hydro-kinetic turbine that may be combined with a microbial fuel cell.

Description of Related Art: Providing stand-alone, low cost, renewable, long term electrical power to underwater electronic systems operating near or on the seafloor is a challenging engineering problem. Microbial fuel cell (MFC) technology shows promise as a renewable low cost, long term means to supplement the energy demands of naval or other electronics systems operating near or on the seafloor. MFCs are bioreactors that convert the energy in the chemical bonds of organic compounds into electrical energy through catalytic activity of microorganisms under anaerobic conditions. The MFC's ideal power potential is currently limited to low power electronics.

Another renewable energy technology is hydro-kinetic (HK) turbines. HK turbines may present a low cost, long term, and renewable energy source. HK turbines work by converting mechanical HK energy into electrical energy. HK turbines tend to work best in high flow environments as the electrical power output of the turbine is proportional to the mechanical force from the water velocity. Underwater turbines primarily work in high flow environments or near the surface of the water. High flow turbines utilize the lift force. Lift based turbines excel in high flow since the lift force increases with the square of the velocity, which also demonstrates why they fail in a low flow environment. Alternative low flow turbines tend to sit at the surface of the water using water flow force to create rotational motion. However, near surface HK turbines are generally inadequate for powering electronics at deeper depths.

In view of the foregoing and for other reasons that will become more apparent, there exists a need in the art for improved systems and methods for providing stand-alone, low cost, renewable, long term electrical power to underwater electronic systems operating near or on a seafloor or low-flow riverbed.

SUMMARY OF THE INVENTION

An embodiment of an underwater power generation system is disclosed. The system may include a hybrid hydro-kinetic (HK) turbine; a shaft rotationally coupled to the HK turbine, the shaft having an axis of rotation; a generator rotationally coupled to the shaft for generating alternating current (AC) electricity; an electronics module for converting the AC electricity into direct current (DC) electricity; a battery for storing the DC electricity; and a base frame configured to support the HK turbine, the shaft, the generator, the electronics module and the battery on a seafloor or riverbed with the axis of rotation perpendicular to the seafloor or the riverbed.

An embodiment of a method of generating electricity underwater is disclosed. The method may include providing an underwater power generation system. The embodiment of an underwater power generation system may include a hybrid HK turbine; a shaft rotationally coupled to the HK turbine, the shaft having an axis of rotation; a generator rotationally coupled to the shaft for generating AC electricity; an electronics module in communication with the generator and configured to convert the AC electricity into primary DC electricity; a MFC with at least one anode affixed to a bottom of the base frame and configured to rest in anoxic conditions in sediment and at least one cathode affixed to the base frame above the sediment, the MFC in communication with the electronics module and configured for gathering secondary DC electricity; a battery in communication with the electronics module and configured for storing the primary and the secondary DC electricity; and a base frame configured to support the HK turbine, the shaft, the generator, the electronics module, the MFC and the battery on a seafloor or riverbed with the axis of rotation perpendicular to the seafloor or the riverbed. The method of generating electricity underwater may further include placing the underwater power generation system on the seafloor or the riverbed at a location exhibiting low flow water moving horizontally through the HK turbine with the MFC resting on or in the sediment; the low flow water rotating the HK turbine and the shaft; the generator generating AC electricity; the electronics module converting the AC electricity to primary DC electricity; and the primary DC electricity charging the battery.

An embodiment of a renewable energy underwater power generation system, is disclosed. The embodiment of a renewable energy underwater power generation system may include a HK turbine; a shaft driven by the HK turbine, the shaft having an axis of rotation; a gearbox driven by the shaft for increasing rotational speed of the shaft; a generator driven by the gearbox outputting AC electricity; an electronics module converting the AC electricity into primary DC electricity; a base frame supporting the HK turbine, the shaft, the generator, the gearbox, the electronics module and the battery on a seafloor or riverbed with the axis of rotation perpendicular to the seafloor or the riverbed; a MFC with at least one anode affixed to a bottom of the base frame for placement on or within sediment on the seafloor or the riverbed and at least one cathode affixed to the base frame above the sediment, the MFC configured for gathering low voltage electricity from the sediment; a flyback converter for converting the low voltage electricity into secondary DC electricity; and a battery for selectively storing the primary and the secondary DC electricity.

BRIEF DESCRIPTION OF THE DRAWINGS

The following drawings illustrate exemplary embodiments for carrying out the invention. Like reference numerals refer to like parts in different views or embodiments of the present invention in the drawings.

DETAILED DESCRIPTION

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment but may be expanded for use with any of the other methods and systems described herein as will be understood by one of ordinary skill in the art unless specifically otherwise stated.

The terms "generator" and "motor" are used interchangeably herein and refer to well-known devices for converting rotational energy into electrical energy and vice versa. The term "generator" as used herein may also incorporate the functionality of a gearbox to adjust input rotational speed applied to the generator. The term "low flow" as used herein refers to gentle water flow that occurs on riverbeds and seafloors due to natural movement of water in the form of persistent currents (riverbeds) or variable currents. The speed of flow in an open channel is highest at the surface in the middle of the channel and slower at the bank or bottom. "Low flow" as used herein implies a range of speed from about 0.5 to 5 km/hr.

The present invention is directed toward solving the technical problem of providing stand-alone, low cost, renewable, long term electrical power to underwater electronic systems operating near or on the seafloor at any suitable depth, e.g., up to about 15 m. One particular solution to this technical problem is a power generation system that may provide up to about 1 v of electricity from about 30 cm/s (1.08 km/hr) ocean or river current flow at seabed or riverbed. Particular embodiments of the system are capable of deploying to an operational depth up to 15 m. Another embodiment of the present invention combines a MFC with a HK turbine. Embodiments of the present invention are particularly useful in supporting the survivability and recharging capabilities of US Navy intelligence, surveillance, and reconnaissance (ISR) sensor systems deployed worldwide. However, it will be understood that the invention has application in any underwater environment that may have suitable conditions for generating electricity in a low flow and/or microbial rich seafloor or riverbed. Embodiments of the present invention provide a means to continuously power systems in areas where turbines were previously not a sustainable option.

Figure 1:
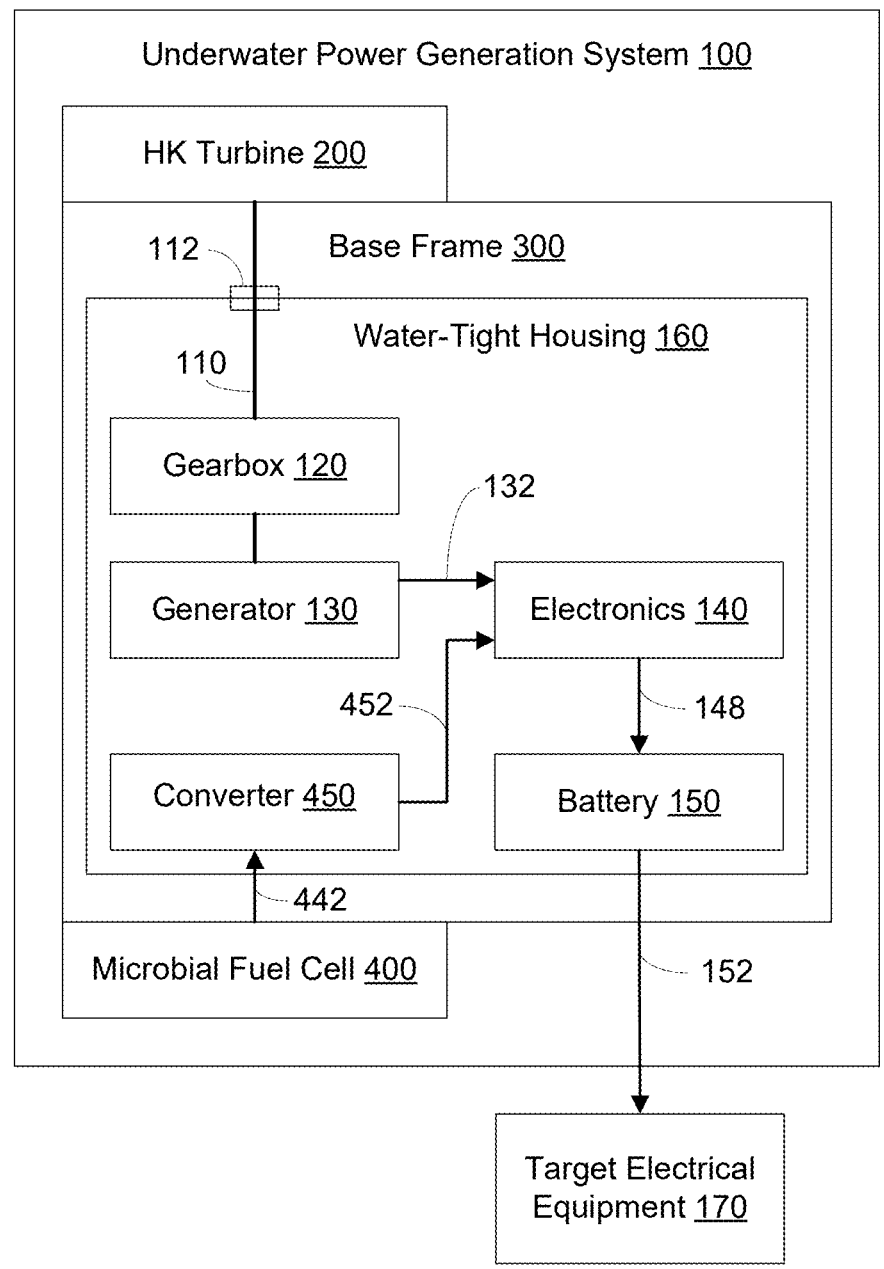
FIG. 1 is a system block diagram of an embodiment of an underwater power generation system, according to the present invention.

FIG. 1 is system block diagram of an embodiment of an underwater power generation system 100 for generating electricity, according to the present invention. As shown in FIG. 1, a HK turbine 200 rotates a shaft 110 under low flow water current conditions located on a riverbed or seafloor (not shown). The HK turbine 200, connected to one end of shaft 110, may be mounted to a base frame 300. The shaft 110 rotates with the HK turbine 200. The other end of shaft 110 may be rotationally connected to a gearbox 120 via an intermediate waterproof bearing 112 at the interface with the water-tight housing 160. As shown in FIG. 1, the output of gearbox 120 may be connected to an electrical generator 130. Gearbox 120 increases the rotational speed of the shaft 110 for improved alternating current (AC) electricity 132 generation efficiency. The AC electricity 132 output from the generator 130 is conditioned by electronics module 140 prior to charging battery 150. More particularly, the AC electricity 132 is rectified (converted to DC) and stepped-up to a higher primary DC electricity 148 as further described below.

System 100 may further include a MFC 400. The MFC 400 may include one or more anodes (not shown in FIG. 1) attached to the bottom of base frame 300 and configured for resting on and/or within a microbial rich sediment within the riverbed or seafloor. The MFC 400 may further include one or more cathodes (also not shown in FIG. 1) attached to the base frame 300 at a location above the sediment in the water, which in combination with the anodes, are configured to gather electrons from the microbial rich sediment within the riverbed or seafloor, and thus generating a low voltage DC electricity 442. The low voltage DC electricity 442 gathered by the MFC 400 is then conditioned by converter 450 and output as secondary DC electricity 452 and then also delivered to the electronics 140 and ultimately to battery 150. More particularly, the low voltage DC electricity 442 is boosted, or stepped-up to a higher secondary DC electricity 452 for charging battery 150. Further aspects of the MFC 400 are described below.

System 100 is configured to deliver battery power 152 to any suitable target electrical equipment 170, device or system that requires electricity to operate, e.g., sensors, data logging, communications equipment, etc. It will be understood that such equipment 170 may also be underwater. According to the illustrated embodiment, gearbox 120, generator 130, electronics module 140, battery 150 and converter 450 may all be housed in a water-tight housing 160. However, it will be understood that water-tight housing 160 could be independently provided for each of these system components 120, 130, 140, 150 and 450, or grouped in such water-tight housings as needed, according to other embodiments of system 100. FIG. 1 illustrates an embodiment of system 100 where the target electrical equipment may be external to system 100. It will be further understood that the target electrical equipment 170 powered by battery power 152 may also be mounted to base frame 300 according to other embodiments. As shown in FIG. 1, both the HK turbine 200 and MFC 400 generate electricity, 132 and 442, respectively, for charging battery 150. This allows system 100 to store energy by charging battery 150 for use on demand. It will be understood that in an alternative embodiment (not shown), system 100 could be used to power target electrical equipment directly without an intervening battery 150. Further description of the features and components of system 100 follows.

Hydro Kinetic Turbine Feature

The inventors are presently unaware of any conventional HK turbines operating simultaneously under low flow conditions at a depth of up to 15 m. The HK turbine of the present invention incorporates a design combining a lift-based turbine and a drag-based turbine which allows both types of turbines to excel.

Figure 2:
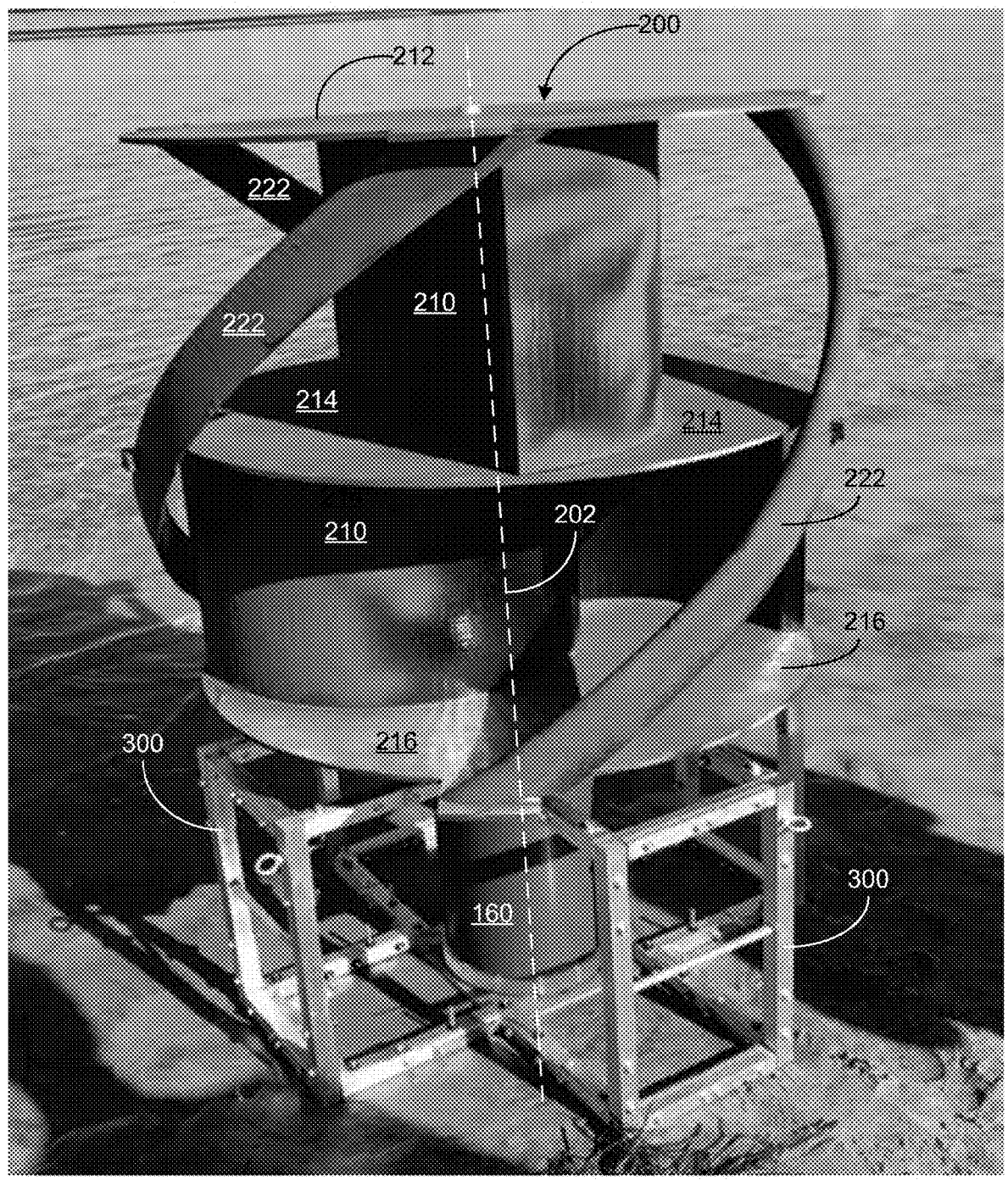
FIG. 2 is a perspective image view of a prototype embodiment of a HK turbine mounted to a base frame, according to the present invention.
Figure 10:
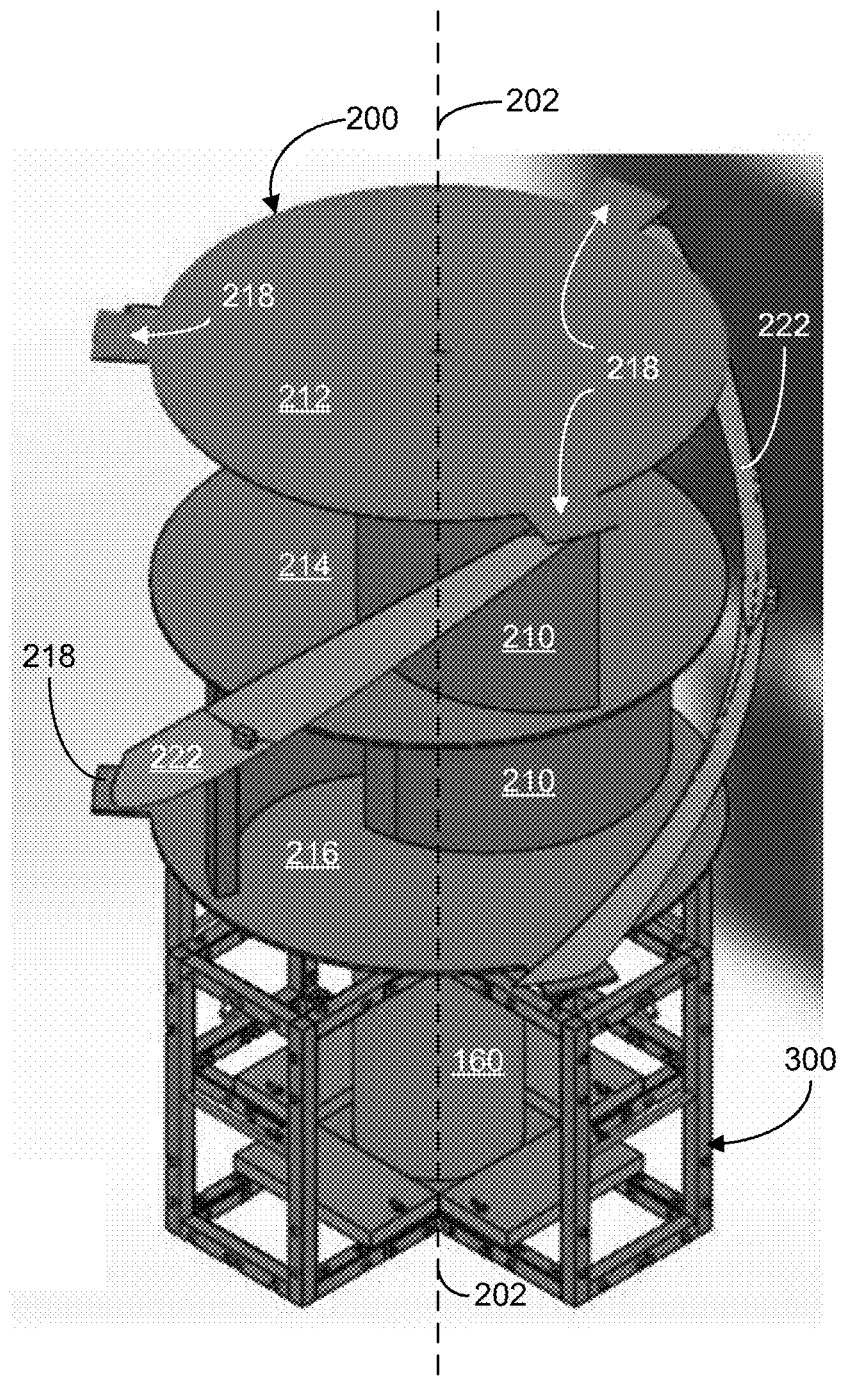
FIG. 10 is a perspective drawing of an exemplary HK turbine mounted to a base frame, according to the present invention.

FIG. 2 is a perspective image view of a prototype embodiment of the HK turbine 200 mounted to a base frame 300, according to the present invention. FIG. 10 is a perspective drawing of an embodiment of a HK turbine 200 mounted to base frame 300, according to the present invention. More particularly, FIGS. 2 and 10 illustrate a novel variant of a HK turbine 200, namely a hybrid helical Darrieus-Savonius C Foil HK turbine 200. FIGS. 2 and 10 illustrates the vertical axis of rotation 202 (dashed lines) about which turbine 200 rotates. As used herein, the term "C foil" refers to the shape of a Savonius bucket 210 when viewed along the axis of rotation 202. FIG. 10 best illustrates top 212, intermediate 214 and bottom 216 plates that surround and divide the two Savonius C foil buckets 210. FIG. 10 also best illustrates tabs 218 disposed on the periphery of the top 212 and bottom 216 plates used to support the three Darrieus helical foils 222 (only two visible in FIG. 10). Beneath the HK turbine 200, a water-tight container 160 is also shown. The Darrieus helical foils 222 may be formed in two parts and assembled at the middle with nuts and bolts (or other suitable fastening means) as illustrated or they may be a single part according to another embodiment, not illustrated.

The inventors determined that a Savonius turbine operates best for low flow applications as it is a drag-based turbine and uses the water's flow force to create rotational motion. A Savonius turbine allows for high startup torque and power coefficient but may suffer when it comes to efficiency. Savonius turbines may have a power coefficient of approximately 0.3 with an efficiency of 20%. Helical blades associated with Darrieus turbines generally have high efficiency but low power coefficients. To take advantage of both turbine configurations, the hybrid helical Darrieus-Savonius C Foil turbine 200 of the present invention acts as a Savonius turbine at low flow and a helical Darrieus turbine at high flow.

When the hybrid Helical Darrieus-Savonius C Foil HK turbine 200 is deployed on a seafloor or riverbed, it gains a high startup torque and power coefficient from the Savonius buckets 210. FIGS. 2 and 10 both illustrate two Savonius buckets 210 oriented orthogonal to one another, separated by intermediate plate 214, and in between top plate 212 and bottom plate 216. FIG. 2 best illustrates all three Darrieus helical foils 222 disposed between top 212 and bottom 216 plates and around both Savonius buckets 210. As best shown in FIG. 10, the three Darrieus helical foils 222 are attached to the top plate 212 and the bottom plate 216 only. According to another embodiment (not illustrated) the three Darrieus helical foils 222 may also be attached to the intermediate plate 214 having tabs 218 (not shown in FIG. 10). Referring again to FIG. 10. the three Darrieus helical foils 222 are dispersed at 120° intervals about the vertical axis of rotation 202 and in combination surround the two Savonius C foil buckets 210. While the exemplary HK turbine 200 illustrates two Savonius buckets 210 and three Darrieus helical foils 222, it will be understood that other quantities of stacked Savonius buckets 210 and peripherally dispersed Darrieus helical foils 222 may be employed in other embodiments of a HK turbine 200 suitable for use with the present invention.

When the water flow picks up, the Darrieus helical foils 222 take over and sustain a constant motion. At lower flows, the Darrieus helical foils 222 create turbulence and vortices that aid the rotation of the Savonius C foils. The HK turbine 200 embodiment illustrated in FIGS. 2 and 10 each include two Savonius C foils. Each C foil 210 sits orthogonal (i.e., rotated 90° about the axis of rotation 202) to the other when viewed along the axis of rotation 202. This allows a sustained rotation of the HK turbine 200 as the Savonius buckets 210 catch the water flow from all directions. The combined hybrid helical Darrieus-Savonius C Foil turbine 200 incorporates critical start-up torque and power coefficient while maintaining an efficiency between a Savonius C foil turbine and a Darrieus helical foil turbine to achieve better average efficiency. To allow the HK turbine 200 to operate at a low flow, it was imperative that the HK turbine 200 was relatively large, but not to the point where size/weight hindered operation or deployment procedures. According to a presently preferred embodiment, the final dimensions of the turbine subsystem are approximately 30 inches tall, and approximately 36 inches wide. This allowed a balance between operation and weight. However, it will be understood that other contemplated embodiments (not illustrated) having a range (greater or smaller) of overall dimensions (width and height) relative to these nominal dimensions that would also function and are considered to be within the scope of the present invention.

Figure 3:
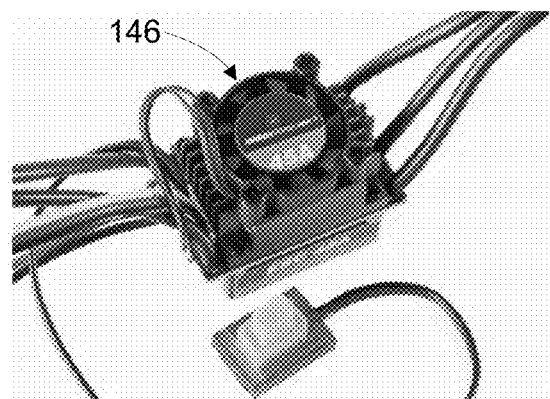
FIG. 3 is an image of an exemplary rectifier.

The HK turbine 200 drives a generator 130 (FIG. 1) via a shaft 110 connected to a gearbox 120. The generator 130 outputs an AC electricity 132 relative to the driveshaft 110 (FIG. 1) speed as modulated by the gearbox 120. The AC output 132 is then conditioned by electronics module 140 for rectification and stepping-up to primary DC electricity 148 for charging battery 150. FIG. 3 is an image of an exemplary rectifier 146, namely a HOBBYKING™ 45A 2~3S Waterproof Brushless Car ESC w/Reverse & 2A BEC. Referring also to FIG. 1, AC output 132 is fed into a rectifier 146 within electronics module 140. According to a presently preferred embodiment, the rectifier 146 may be a brushless rectifier, HOBBYKING™ 45A 2~3S Waterproof Brushless Car ESC w/Reverse & 2A BEC, available from Global Column Limited, LLC, Hong Kong, HOBBYKING.COM®. It will be understood that any suitable electronic circuit or rectifier for converting AC electricity to DC electricity may be used consistent with the teachings of the present invention. According to a particular embodiment, the low voltage DC output of this rectifier 146 may then be stepped up to 12 v. It will be understood that any suitable electric circuit for converting the low voltage from the rectifier 146 to about 12 V DC for charging battery 150 may be used according to the present invention. According to a particular embodiment, two serial boost converters may be used as described below.

Figure 4:
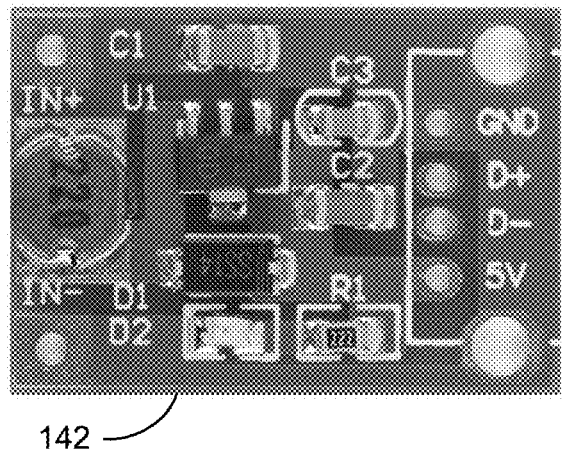
FIG. 4 is an image of an exemplary 0-5 V step-up converter.

FIG. 4 is an image of an exemplary 0-5 v step-up converter 142 suitable for use in the electronics module 140, according to the present invention. More particularly, FIG. 4 illustrates a converter 142 having part number HW-553, with the following description: 5V voltage boost circuit board mobile power supply USB excluded mini module voltage booster, available from various sources including Amazon.com.

Figure 5:
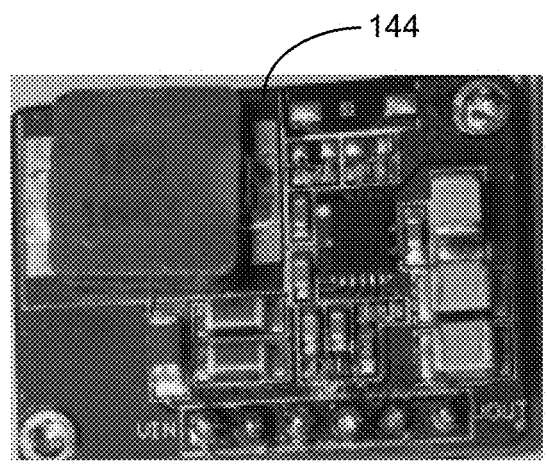
FIG. 5 is an image of an exemplary 5-15 V step-up converter.

FIG. 5 is an image of an exemplary 5-15 v step-up converter 144 suitable for use in the electronics module 140, according to the present invention. According to this particular embodiment of electronics module 140, the output of the 0-5 v boost converter 142 may then be fed into another boost converter 144, namely, a 5-15 v boost, or step-up, converter 144, also available from various sources.

Figure 6:
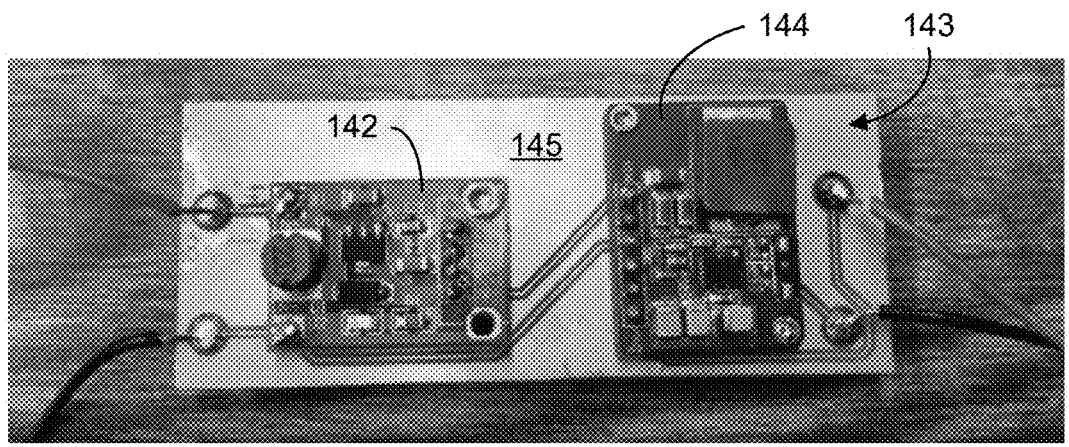
FIG. 6 is an image of an exemplary dual voltage boost assembly including the step-up converters shown in FIGS. 4 and 5 mounted to a substrate, according to the present invention.

FIG. 6 is an image of an exemplary dual voltage boost assembly 143 including the step-up converters 142 and 144 shown in FIGS. 4 and 5 mounted to a substrate 145, according to the present invention. The power for dual voltage boost assembly 143 including converter circuits 142 and 144 is supplied directly by the generator 130 and may require a minimum input voltage (e.g., 1 v DC) to engage. Once the minimum threshold is reached, the first stage boost converter 142 converts the output voltage to 5 v. At this point the second stage boost converter 144 converts the 5 v voltage to the final output of 12 v. These boost converters 142 and 144 are commercially available with efficiencies more than 90% each. According to a particular embodiment, the final 12 v bus may be protected from backflow to the generator 130 by an in-line diode (not shown).

As noted herein, the technical solution to providing electrical power generation underwater in low flow conditions on a seafloor or riverbed achieved by the present invention includes both the previously described HK turbine 200 and a MFC 400. Electronics 140 may further include a controller (not shown for simplicity) that may selectively charge the battery 150 based on whichever power source (HK turbine 200 or MFC 400) is generating more power at a given time or by charging the battery 150 from both sources simultaneously. It will be understood that any suitable power controller may be employed with the present invention and that such controllers and associated functionality is known to those of ordinary skill in the art and thus will not be further elaborated herein. The inventive underwater power generation system provides power from two sources. More particularly, the invention includes a HK turbine 200 and a MFC 400. The HK turbine 200 generates power under water in low-flow conditions. The integrated MFC 400 may be disposed underneath the base frame 300 with anodes 404, 402 in or on sediment on a seafloor or riverbed and generates power in suitable microbial sediments. Further detailed description of the invention, beginning with the MFC 400 follows.

Microbial Fuel Cell Feature

As noted above, one aspect of the present invention is an attached benthic MFC 400 which can gather renewable electrical energy independently of the HK turbine 200. MFC 400 is an electrochemical device that generate electrical current from the natural redox gradients that commonly occur across the sediment-water interface. In general, such a benthic MFC consists of a circuit in which inert but electrically conductive electrodes are placed in an anoxic zone (the anode) and an oxic zone (cathode). The electrodes are connected through a load such as an external resistor, potentiostat, or a sensor system. Electrons resulting from microbial metabolic activity are transferred from electron donors to the anode and flow through the load to the cathode, where they lead to the reduction of dissolved oxygen to water. Embodiments of the MFC of the present invention may include one or more anodes, one or more cathodes, and an intermediate electrical load.

Figure 15:
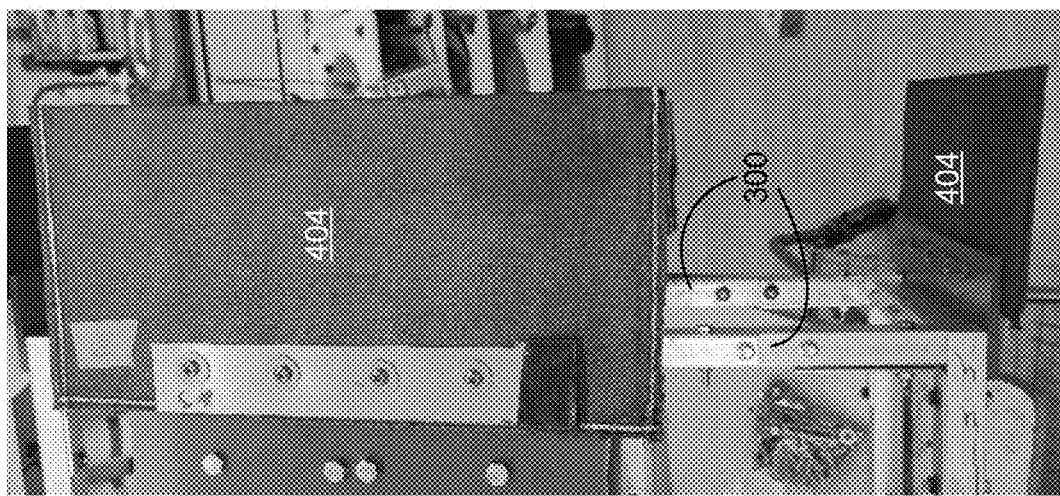
FIG. 15 is a close-up, side view image of two vertical burial anodes, according to the present invention.
Figure 14:
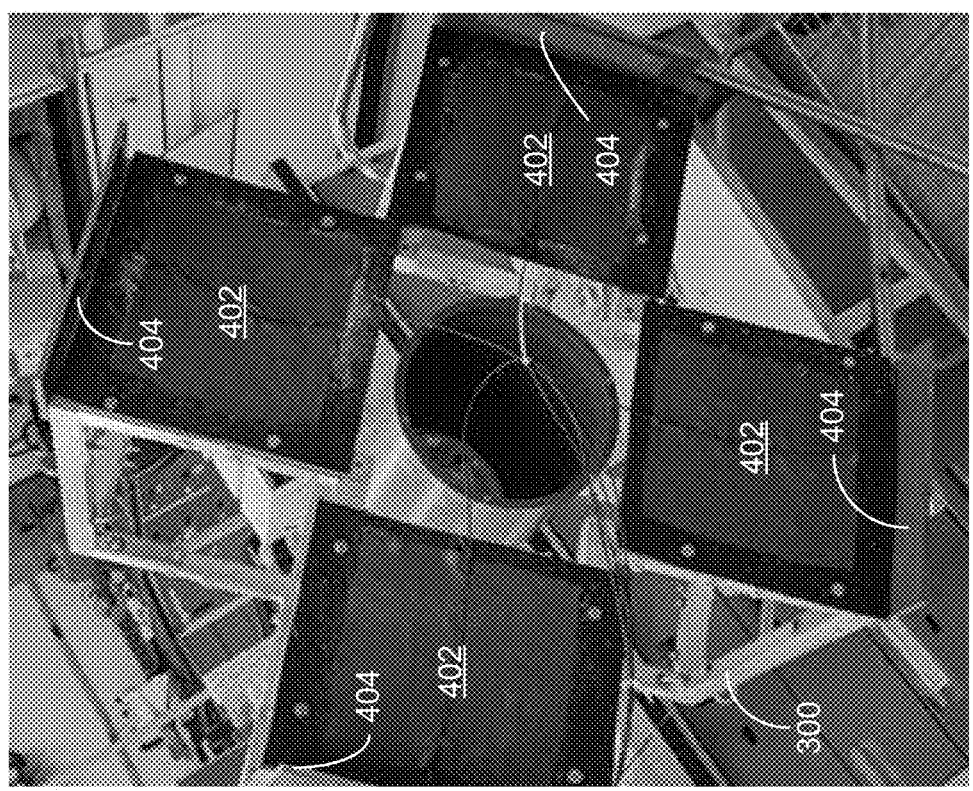
FIG. 14 is a bottom view image of a base frame illustrating placement of horizontal surface anodes and vertical burial anodes on the base frame feet, according to the present invention.

FIG. 14 is a bottom view image of a base frame 300 illustrating placement of horizontal surface anodes 402 and vertical burial anodes 404 disposed on the base frame feet 310, according to the present invention. FIG. 15 is a close-up, side view image of two vertical burial anodes 404, according to the present invention. Anodes 402 and 404 may be formed of any suitable material as described herein. The illustrated anodes 402 and 404 may be formed of carbon mesh or carbon mesh cloth panels bolted to base frame feet 310 with wire harnesses attached as shown in FIGS. 14 and 15. The vertical burial anodes 404 may be disposed about the extremities of the base frame feet 310 and are configured to penetrate into seafloor or riverbed sediment. Depending on the particular sediment location it may be advantageous to remove the vertical burial anodes 404, for example shallow or rocky sediment. However, it will be understood that any suitable configuration of anodes 402 and 404 may be employed in the MFC 400 of the present invention, in the presence of suitable microbial sediment for MFC 400 operation.

Figure 16:
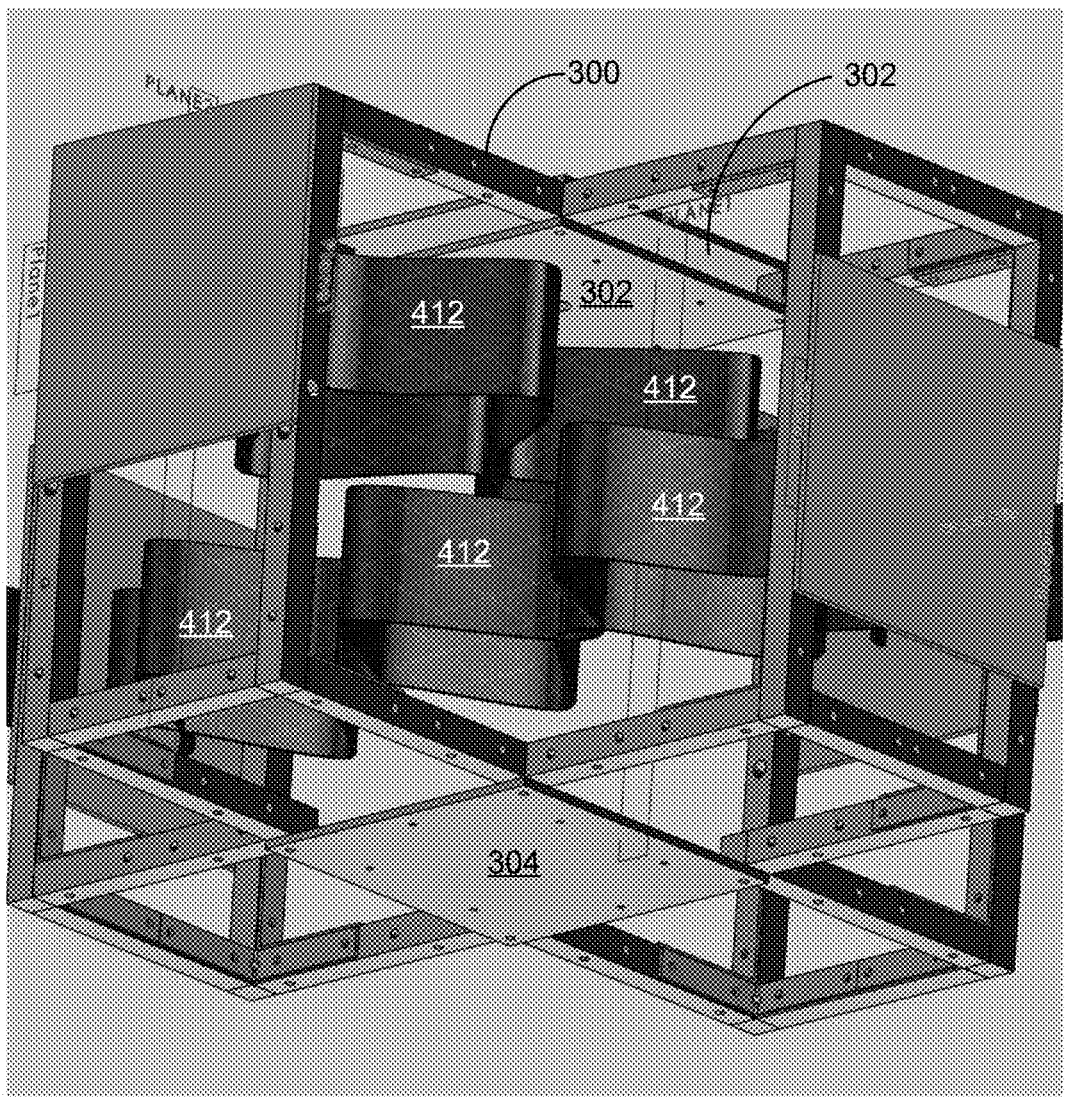
FIG. 16 is a perspective view drawing of an exemplary cathode configuration suitable for use in the MFC in an underwater power generation system, according to the present invention.

FIG. 16 is a perspective view drawing of an exemplary cathode 412 configuration suitable for use in the MFC 400 in an underwater power generation system 100, according to the present invention. As shown in FIG. 16, a plurality of cathodes 412 may attached to base frame 300 in the form of carbon mesh, or carbon mesh cloth ribbons (as illustrated) or wrapped around plastic plates (not shown), or even wrapped around the water-tight housing 160 (also not shown). The particular placement of the one or more cathodes 412 is not critical to the functioning of the MFC 400. The cathodes 412 need merely be suspended above the sediment and in the water environment during operation. FIG. 16 further illustrates bottom center panel 304 and top center panels 302 attached to base frame 300.

The anode of the MFC 400 accepts electrons from biological and abiotic processes. Primarily, the anode is a solid-phase terminal electron acceptor for microbial metabolism. To insure consistent, long-term performance, preferred benthic MFC anode materials should be impervious to biological or abiotic corrosion, passivation or degradation. Suitable materials for use in a MFC anode according to the present invention may include, but are not limited to platinum mesh, graphite discs, plates or rods, corrosion-resistant stainless steel, carbon fiber cloth, glassy carbon and modified graphite (i.e., with surface treatments such as doping with platinum manganese, nickel, iron and compounds), Fe-Co tetramethoxyphenyl porphyrin (FeCoTMPP), carbon sponge and reticulated vitreous carbon and similar materials.

The function of a benthic MFC cathode is to donate electrons to available acceptors, thus enabling the continuous flow of current from the anode. In most cases the terminal electron acceptor at the cathode is dissolved oxygen in the surrounding seawater. In general, one can employ the same carbon-based electrode materials that are used for the anode. The cathode 412 may be attached virtually anywhere to the base frame 300 above the sediment. According to a particular embodiment of the MFC 400, the cathode may be formed of carbon cloth.

During operation, the anode electrode is buried in the seafloor sediment at a depth sufficient to sustain anaerobic metabolic activity of surrounding microbial colonies. As the microbes consume surrounding nutrients, they convert organic compounds into a small, but harvestable amount of electrical energy. This electrical energy (low voltage DC electricity) can be conditioned (stepped-up), stored in one or more batteries 150 for delivery to a target electrical equipment 170 requiring operational power.

According to the present invention, the low voltage DC electricity 442 gathered by the MFC 400 may be controlled and conditioned by converter 450. It will be understood that any suitable converter 450 circuit may be employed for receiving low voltage DC 442 gathered by the MFC 400 and converting it up to a usable voltage for storage in a battery 150 or operation of electronic circuitry. According to a particular embodiment of MFC 400, converter 450 may be a flyback-based converter 450 as disclosed in Jerome T. Babauta, Maxwell Kerber, Lewis Hsu, Alex Phipps, D. Bart Chadwick and Y. Meriah Arias-Thode, "Scaling up benthic microbial fuel cells using flyback converters, Journal of Power Sources, Vol. 395, pp. 98-105, 15 Aug. 2018, the contents of which are hereby incorporated by reference for all purposes. Flyback-based converter 450 may be used to convert the MFC output DC voltage 442 to 400 mv DC while boosting the secondary DC voltage output 452 above 12 v DC. The final 12 v power bus may further be protected from backflow to the generator 130 by an in-line diode (not shown). FIG. 1 illustrates converter 450 as a separate module from electronics 140. It will be understood that converter 450 may also be a module, or circuitry integrated within electronics 140, according to other embodiments.

Thus primary DC voltage 148 and secondary DC voltage 452 may feed a single 12 v power bus with embedded storage in battery 150. It will be understood that battery 150 may be a single rechargeable battery or a plurality of rechargeable batteries in any suitable arrangement for storing power for use by target electrical equipment 170. According to a particular embodiment, battery 150 may be a rechargeable 12 v Lithium Iron Phosphate (LiFePO4) battery 150. Battery 150 acts as energy storage and capacitance within the system 100. This battery power 152 can be used by any suitable target electrical equipment 170, for example and not by way of limitation, power measurement devices, communications devices, or to trigger threshold-based events.

Water-Tight Housing

Figure 7:
FIG. 7 is an image of an exemplary plastic water-tight housing suitable for use in the present invention.

As shown in FIG. 1, a water-tight housing 160 is required to protect electrically sensitive components of system 100 at a preselected operational water depth and allow for shaft 110 from HK turbine 200 to engage the gearbox 120 and associated generator 130 inside housing 160. It will be understood that any suitable water-tight housing(s) 160 capable of housing gearbox 120, generator 130, electronic module 140, converter 450 and battery 150, while still interfacing with external components, namely shaft 110, MFC 400 and target electrical equipment 170 may be employed in the system 100 according to the present invention. Another requirement for water-tight housing 160 is that it must fit within, and be attached to, base frame 300. Presently preferred embodiments of a water-tight plastic or metal housings 160 for submersible instrumentation may be sourced from Prevco Subsea LLC, 10000 Technology Dr, Fountain Hills, AZ 85268, under the PREVCO® brand name. For example, and not by way of limitation, FIG. 7 is an image of an exemplary PREVCO® brand plastic water-tight housing 160 suitable for use in the present invention at a depth of up to 15 m. It will be understood that operation at depths exceeding 15 m may require modification to the seal at the waterproof bearing 112, even though the PREVCO® brand plastic water-tight housing 160 in FIG. 7 may be capable of operation at depths greater than 15 m. Additionally, the use of a metal water-tight housing 160 may be required depending on the operational depth of system 100.

Figure 8:
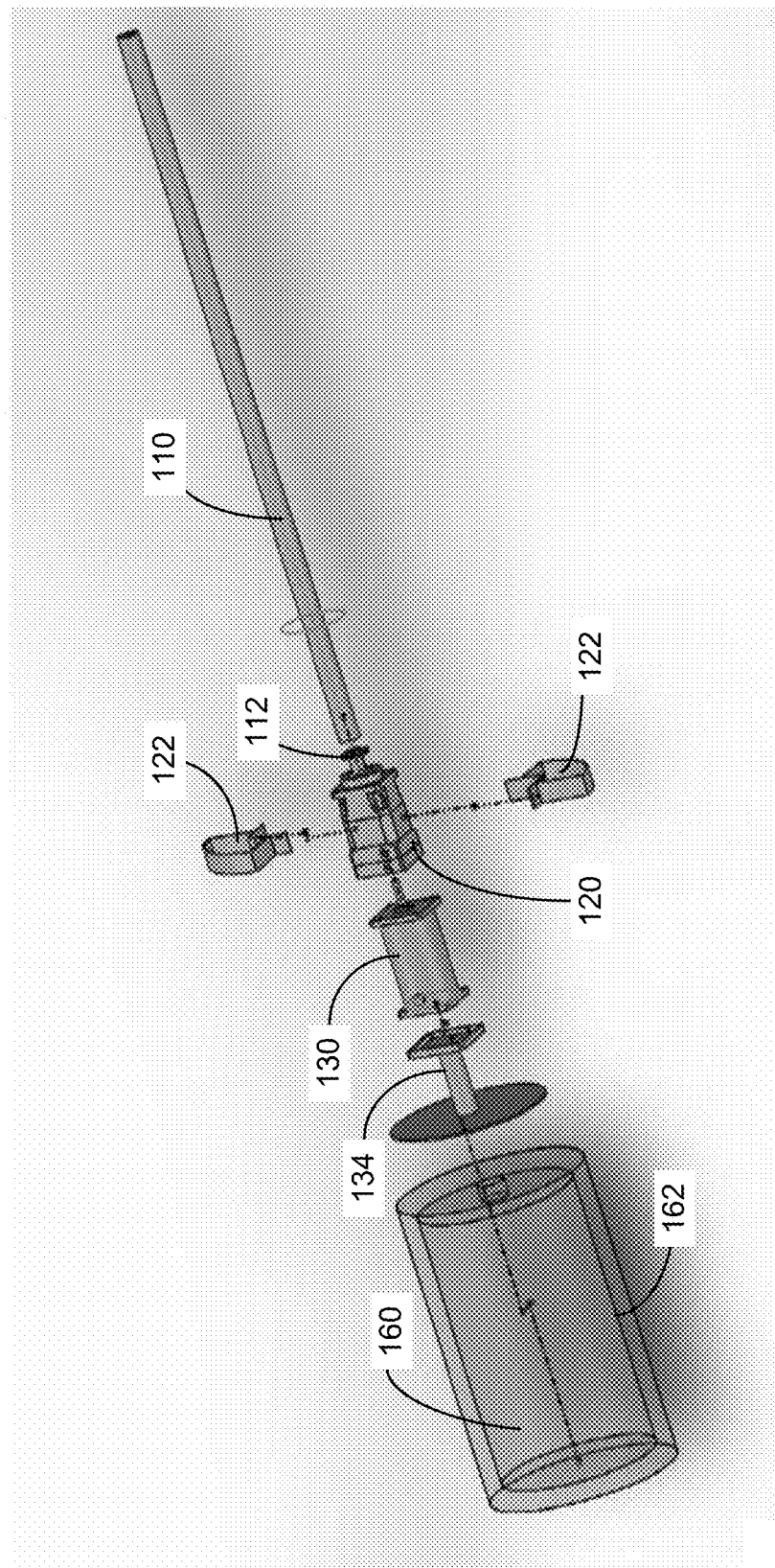
FIG. 8 is an exploded view drawing of an exemplary water-tight housing, generator, gearbox, shaft and mounting hardware, according to the present invention.

FIG. 8 is an exploded view drawing of an exemplary water-tight housing 160, generator 130, gearbox 120, shaft 110 and mounting hardware, according to the present invention. More particularly, generator 130 may be supported by a generator base mount 134 configured to fit within water-tight housing 160. Gearbox 120 is rotationally coupled to generator 130 and may be supported by a couple of gearbox brackets 122 that may have an interference fit with the inner surface 162 of the water-tight housing 160. Finally, FIG. 8 illustrates shaft 110 which may be rotationally coupled to gearbox 120 and is supported with waterproof bearing 112 at the interface with the water-tight housing 160 (best shown in FIG. 11). Though not shown in FIG. 8, the electronics module 140 with all of its associated circuitry, battery 150, and wire harnesses may be incorporated within the available space within water-tight housing 160 not occupied by generator base mount 134, generator 130, gearbox 120 gearbox brackets 122 and shaft 110 (best shown in FIG. 12).

Figure 11:
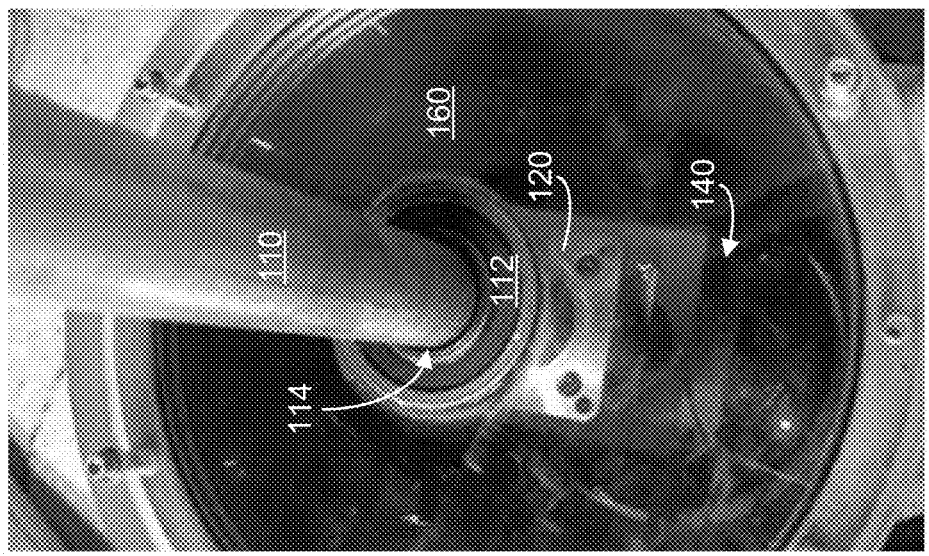
FIG. 11 is a perspective image illustrating an embodiment of a waterproof bearing supporting a shaft at the interface with the water-tight housing, according to the present invention.

FIG. 11 is a perspective image illustrating an embodiment of a waterproof bearing 112 supporting a shaft 110 at the interface 114 with the water-tight housing 160, according to the present invention. FIG. 11 further illustrates a clear plastic top cover on housing 160 which allows a partial view of gearbox 120 and electronics module 140.

Figure 12:
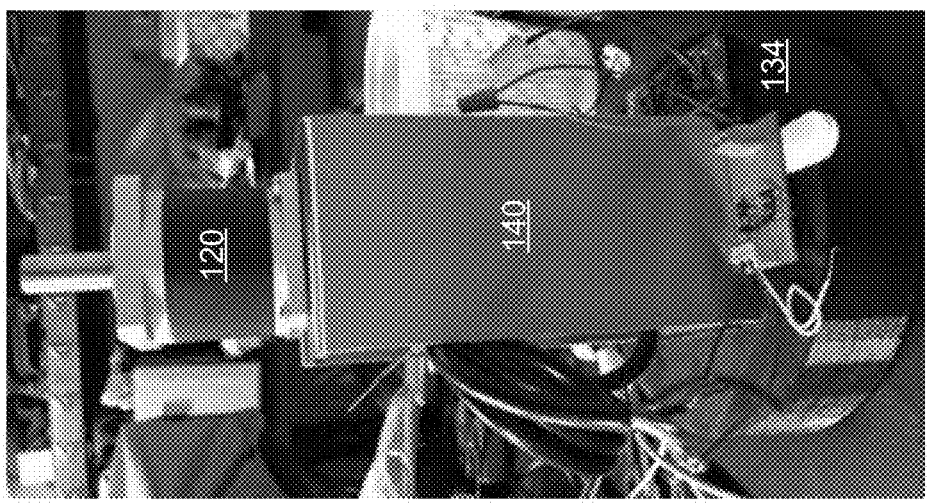
FIG. 12 is a perspective image illustrating an exemplary gearbox and electronics module 140 installed on a generator base mount, according to the present invention.

FIG. 12 is a perspective image illustrating an exemplary gearbox 120 and electronics module 140 installed on a generator base mount 134, according to the present invention. Though not visible in FIG. 12, generator 130 is located within the exemplary electronics module 140. The generator base mount 134 forms a support structure for the generator 130 and the electronics module 140.

Base Frame

Figure 9:
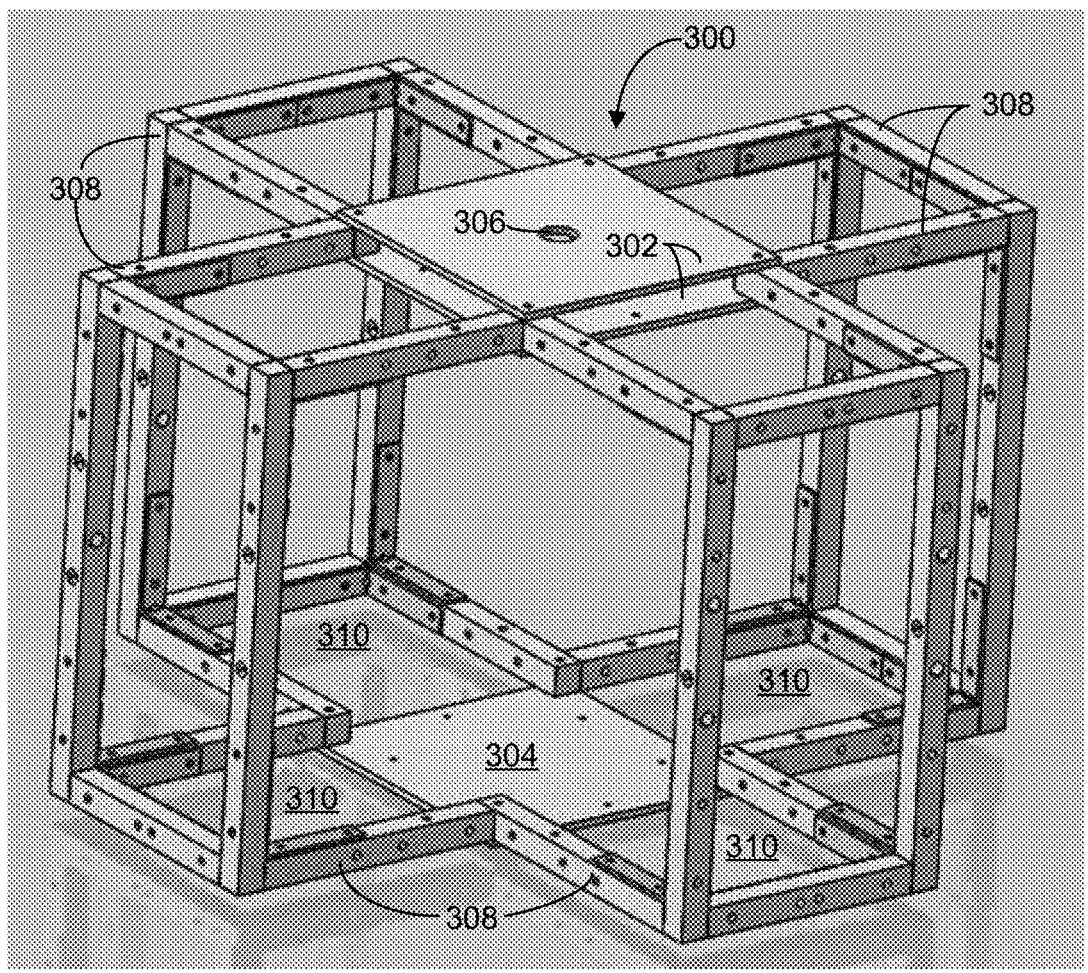
FIG. 9 is a perspective view of an exemplary base frame, according to the present invention.

FIG. 9 is a perspective drawing of an exemplary base frame 300, according to the present invention. As can be seen in FIG. 9, the base frame 300 has a 3D plus or cross shape extending generally between top center panels 302 and a bottom center panel 304. The region directly between top center panels 302 and a bottom center panel 304 may be configured to receive and secure the water-tight housing 160 (not shown). Top center panels 302 may be configured with holes 306 (only one shown) to receive shaft 110 (not shown). Other portions of the base frame 300 may be formed of an appropriate structural material, for example and not by way of limitation, aluminum, steel, carbon fiber, etc., as hollow bar members 308 with holes for assembling with brackets, nuts and bolts as needed for a given load bearing structure. Note that such hollow bar members 308 may be powder coated or otherwise surface treated to resist corrosion in the water environment for which system 100 operates. It will be understood that the HK turbine 200 (not shown) will be attached to the top of base frame 300 and that bottom rectangular feet 310 may be configured with anodes (not shown in FIG. 9 but see FIGS. 14 and 15) associated with the MFC 400. Base frame 300 may further be used to support cathodes (again not shown in FIG. 9 but see FIG. 16) associated with the MFC 400. It will be understood that variations on the particular embodiment of base frame 300 shown in FIG. 9 will be readily understood by one of ordinary skill in the art but are considered to be with the spirit and scope of the present invention.

Figure 13:
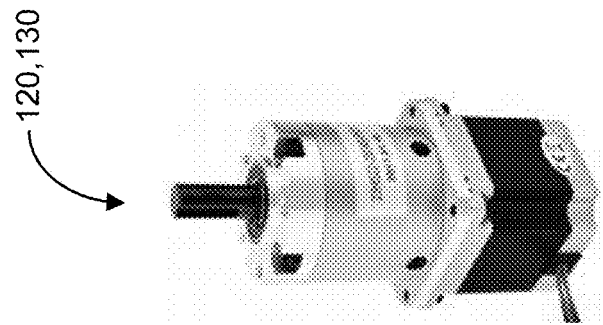
FIG. 13 is an image of a conventional stepper motor and planetary gearbox suitable for use in the present invention.

FIG. 13 is a perspective image view of a conventional stepper motor 130 and planetary gearbox 120 suitable for use in the present invention. It will be understood that any suitable motor/generator 130 or gearbox 120 capable of converting rotational motion from shaft 110 into AC electricity 132 may be employed in the present invention. The particular motor/generator 130 with integrated gearbox 120 illustrated in FIG. 13 is a Nema 23™ 15:1 planetary gearbox and stepper motor, part number 23HS22-2804S-PG15, available from STEPPERONLINE®, 228 Park Ave S 79525, New York, NY 10003.

Figure 17:
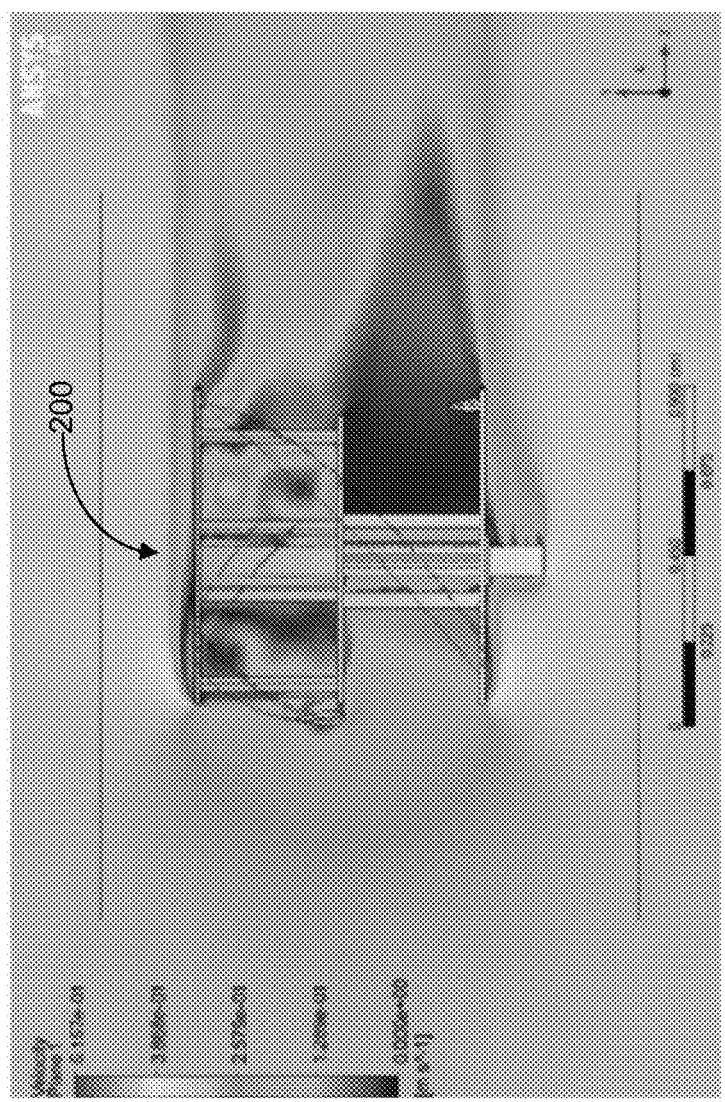
FIG. 17 illustrates a side view simulation of dynamic flow gradient for a hybrid HK turbine, according to the present invention.
Figure 18:
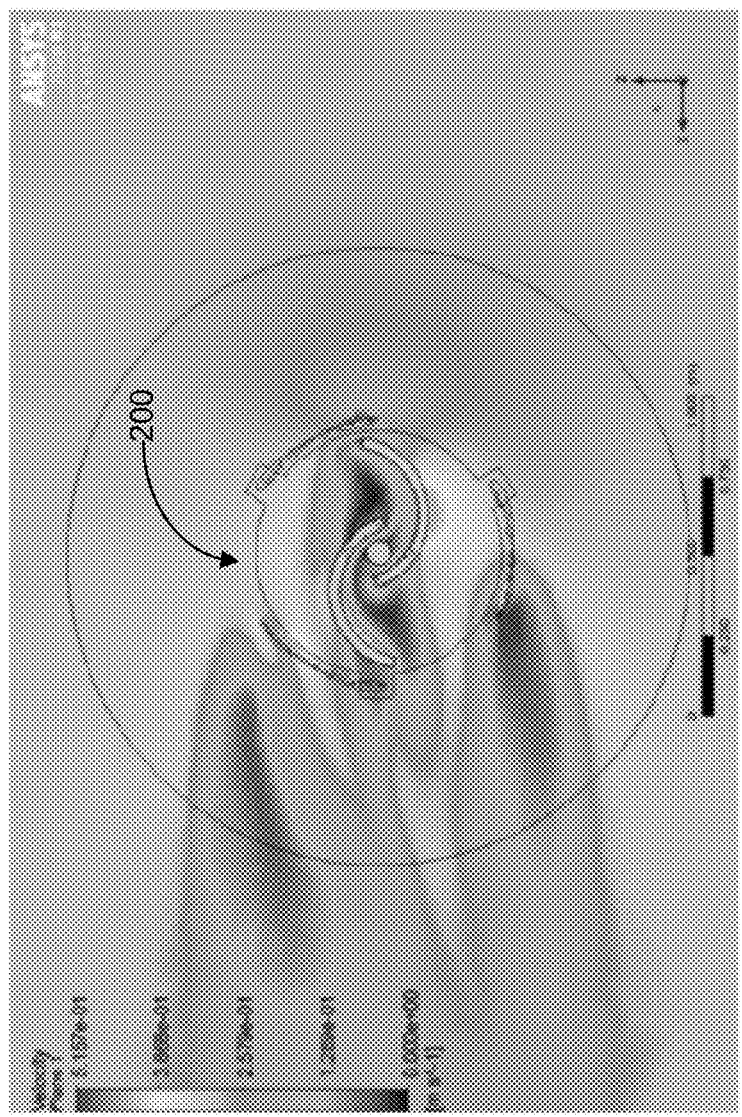
FIG. 18 illustrates a top view simulation of dynamic flow gradient for a hybrid HK turbine, according to the present invention.
Figure 19:
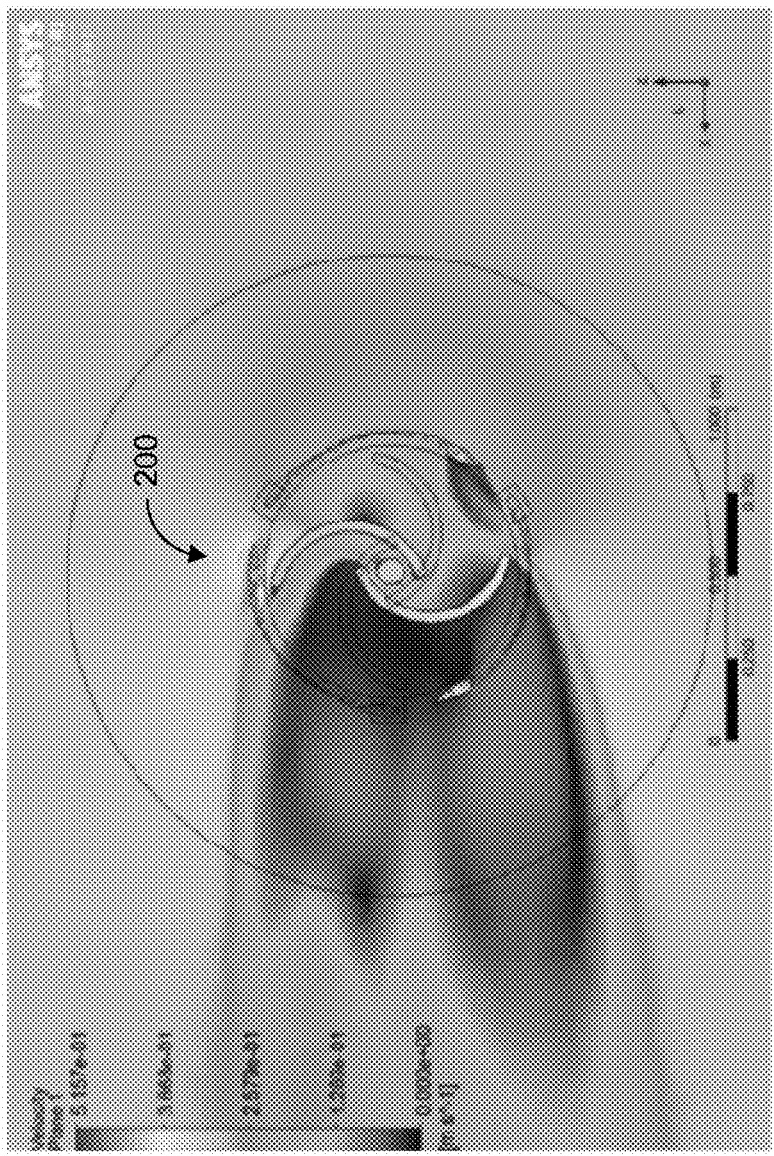
FIG. 19 illustrates a bottom view simulation of dynamic flow gradient for a hybrid HK turbine, according to the present invention.

The inventors have modeled the inventive hybrid HK turbine 200 for water flow dynamics and predicted performance characteristics. FIG. 17 illustrates a side view simulation of dynamic water flow gradient for a hybrid HK turbine 200, according to the present invention. FIG. 18 illustrates a top view simulation of dynamic water flow gradient for a hybrid HK turbine 200, according to the present invention. Finally, FIG. 19 illustrates a bottom view simulation of dynamic water flow gradient for a hybrid HK turbine 200, according to the present invention.

Operation of the Invention

Prior to operation of the underwater power generation system 100, the four primary subsystems must be assembled: base frame 300, water-tight housing 160, HK turbine 200 with Savonius buckets 210 and Darrieus helical foils 222, and MFC 400 with anodes 402, 404 and cathodes 412. Initially, the water-tight housing 160 is opened and the shaft 110 from the HK turbine 200 is connected to the gearbox 120 and attached generator 130. The water-tight housing 160 is then greased around all O-rings, closed and tightened. The combined HK turbine 200 with shaft 110 connected through the water-tight housing 160 is placed within the center of the base frame 300 subassembly with MFC 400 attached. Mounting bolts protruding from the water-tight housing 160 cap are configured to fit into the top center panels 302, thus locking the water-tight housing 160 into place and preventing rotational motion of the combined subassemblies. The nearly assembled system 100 will then need to be elevated, or placed on its side, so that cables, used to power any pre-determined device, can connect to the base of the water-tight housing 160. Finally, the fully assembled system 100 can be transported to the desired deployment location where it may be placed by hand, or by the assistance of cranes, into the marine environment. Provided there is enough current, the HK turbine 200 of system 100 will then begin to rotate and power any pre-determined equipment. Additionally, as long as there is an anerobic layer formed on the MFC 400 anodes 402, 404, they will assist in the power production. System 100 is simple to use.

Figure 20:
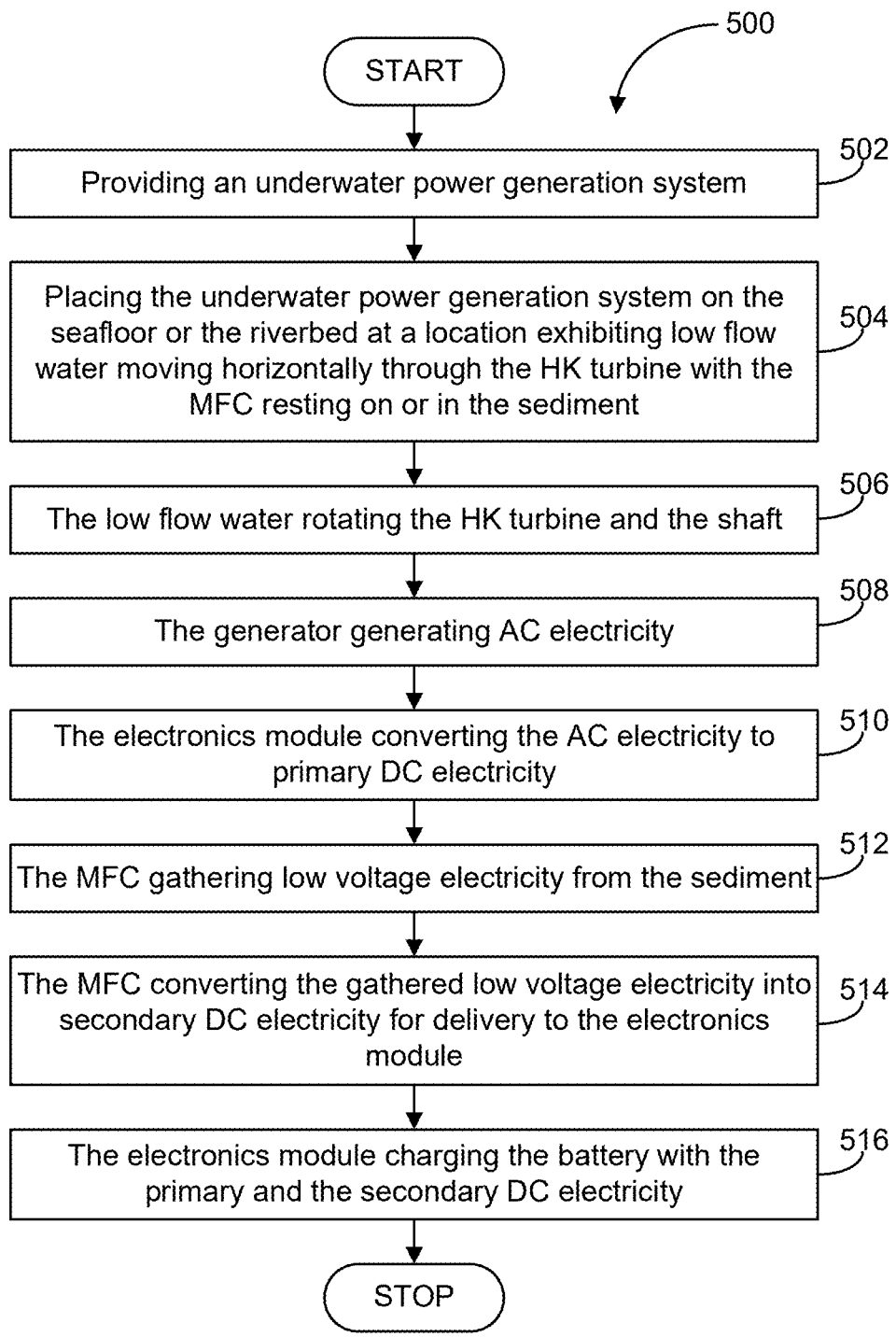
FIG. 20 is a flowchart of a method of generating electricity underwater, according to the present invention.

FIG. 20 is a flowchart of a method 500 of generating electricity underwater, according to the present invention. Method 500 may include providing 502 an underwater power generation system. It will be understood that the underwater power generation system may be system 100 as described herein. For example, and not by way of limitation, the provided 502 underwater power generation system 100 may include a HK turbine 200 as described herein. The provided 502 underwater power generation system 100 may further include a shaft 110 rotationally coupled to the HK turbine 200, the shaft 110 having an axis of rotation 202. The provided 502 underwater power generation system 100 may further include a generator 130 rotationally coupled to the shaft 110 for generating AC electricity 132. The provided 502 underwater power generation system may further include a gearbox 120 in between the shaft 110 and the generator 130 for increasing rotational speed applied to the generator 130. The provided 502 underwater power generation system 100 may further include an electronics module 140 in communication with the generator 130 and configured to convert the AC electricity 132 into primary DC electricity 148. The provided 502 underwater power generation system 100 may further include a MFC 400 with at least one anode 402, 404 affixed to a bottom of the base frame 300 and configured to rest at least partially within sediment exhibiting anoxic conditions, and at least one cathode 412 affixed to the base frame 300 above the sediment. According to this embodiment the MFC 400 may be in communication the electronics module 140 and configured for gathering secondary DC electricity 452. The provided 502 underwater power generation system 100 may further include a battery 150 for storing the primary 148 and the secondary 452 DC electricity. The provided 502 underwater power generation system 100 may further include a base frame 300 configured to support the HK turbine 200, the shaft 110, the generator 130, the gearbox 120, the electronics module 140, the battery 150 and MFC 400 on a seafloor or riverbed with the axis of rotation 202 perpendicular to the seafloor or the riverbed.

Method 500 may further include 504 placing the underwater power generation system 100 on the seafloor or the riverbed at a location exhibiting low flow water moving horizontally through the HK turbine 200 with the MFC 400 resting on or in the sediment. Method 500 may further include the low flow water rotating 506 the HK turbine 200 and the shaft 110. Method 500 may further include 508 the generator 130 generating AC electricity 132. Method 500 may further include 510 the electronics module 140 converting the AC electricity 132 to primary DC electricity 148. Method 500 may further include 512 the MFC gathering low voltage electricity from the sediment. Method 500 may further include 514 the MFC 400 converting the gathered low voltage electricity into secondary DC electricity 452 for delivery to the electronics module 140. Method 500 may further include 516 the electronics module 140 charging the battery 150 with the primary 148 and the secondary 452 DC electricity. It will be understood that the provided 502 underwater power generation system 100 may be capable of charging 516 with either the HK turbine 200 or the MFC 400 independently and in tandem, according to other embodiments of method 500.

According to another embodiment of method 500, the MFC 400 may further include a flyback converter for converting the gathered low voltage DC electricity 442 into the secondary DC electricity 452. According to still another embodiment of method 500, the MFC 400 may further include a plurality of horizontally oriented surface anodes 402 and vertically oriented anodes 404 configured to rest on or within the sediment. According to yet another embodiment of method 500, the hybrid HK turbine may include two Savonius C foils surrounded by three of Darrieus helical foils, wherein all of the foils are arranged to provide rotation to the shaft under low flow conditions during operation on the seafloor or the riverbed.

According to a particular embodiment of method 500, the base frame 300 may further include a 3-dimensional cross-shape with four arms, each arm extending outward from a central cavity, and extending upward toward the HK turbine 200 from a bottom end of the base frame 300. According to this embodiment, the central cavity may be configured for holding a water-tight housing 160 for containing and protecting the generator 130, the gearbox 120, the electronics module 140 and the battery 150.

In view of the particular embodiments of underwater power generation system 100 with hybrid HK turbine 200, MFC 400 and method 500 described herein with reference to the drawings above, more general embodiments of the system and its components and subsystems according to the present invention are disclosed below.

An embodiment of an underwater power generation system is disclosed. The system embodiment may include a hybrid HK turbine. The system embodiment may further include a shaft rotationally coupled to the HK turbine. According to this system embodiment, the shaft has an axis of rotation. The system embodiment may further include a generator rotationally coupled to the shaft for generating AC electricity. The system embodiment may further include an electronics module for converting the AC electricity into DC electricity. The system embodiment may further include a battery for storing the DC electricity. The system embodiment may further include a base frame configured to support the HK turbine, the shaft, the generator, the electronics module and the battery on a seafloor or riverbed with the axis of rotation perpendicular to the seafloor or the riverbed.

According to another embodiment, the underwater power generation system may further include a water-tight housing for containing and protecting the generator, the electronics module and the battery. According to yet another system embodiment, the hybrid HK turbine may further include a plurality of Savonius C foils surrounded by a plurality of Darrieus helical foils arranged to provide rotation to the shaft under low flow conditions on the seafloor or the riverbed. According to a more particular system embodiment, the plurality of Savonius C foils may include two vertically stacked and orthogonally oriented Savonius C foils. According to still another system embodiment, the plurality of Darrieus helical foils may include three Darrieus helical foils arranged in a 120° phased relationship to one another. According to yet still another system embodiment, the underwater power generation system may further include a top plate, an intermediate plate and bottom plate. According to this system embodiment, the two vertically stacked and orthogonally oriented Savonius C foils are disposed between the top and the bottom plates and the intermediate plate is disposed between the two vertically stacked and orthogonally oriented Savonius C foils.

According to another embodiment, the underwater power generation system may further include a gearbox connected between the shaft and the generator for increasing rotational speed provided by the shaft to the generator. According to one system embodiment, the electronics module may convert the output of the generator into DC electricity suitable for charging the battery.

According to another embodiment, the underwater power generation system may further include a MFC with at least one anode affixed to the bottom of the base frame. According to this system embodiment, the anode of the MFC may be configured to rest in anoxic conditions on or within, e.g., and not by way of limitation within sediment at seafloor or a low-flow riverbed. According to this system embodiment, the MFC may further include at least one cathode attached to the base frame above the sediment, the MFC in communication with the battery via the electronics module. According to another embodiment, the MFC of the underwater power generation system may further include a flyback converter for conditioning the electrical output of the MFC into direct current (DC) electricity for charging the battery. According to yet another embodiment, the MFC of the underwater power generation system may further include a plurality of horizontal surface and vertical blade anodes configured to rest on or within the sediment.

According to an embodiment of the underwater power generation system, the base frame may have a cross-shaped cross-section perpendicular to the axis of rotation, wherein each arm of the cross extends from a central cavity configured for securing a water-tight housing for containing and protecting the generator, the electronics module and the battery. According to a particular system embodiment, each of the arms of the base frame may include a foot at its bottom end, the feet configured to rest in sediment on the seafloor or the riverbed.

An embodiment of a renewable energy underwater power generation system is disclosed. The system embodiment may include a HK turbine. The system embodiment may further include a shaft driven by the HK turbine, the shaft having an axis of rotation. The system embodiment may further include a gearbox driven by the shaft for increasing rotational speed of the shaft. The system embodiment may further include a generator driven by the gearbox outputting AC electricity. The system embodiment may further include an electronics module converting the AC electricity into primary DC electricity. The system embodiment may further include a base frame supporting the HK turbine, the shaft, the generator, the gearbox, the electronics module and the battery on a seafloor or riverbed with the axis of rotation perpendicular to the seafloor or the riverbed. The system embodiment may further include a MFC with at least one anode affixed to a bottom of the base frame for placement on or within sediment on the seafloor or the riverbed and at least one cathode affixed to the base frame above the sediment, the MFC configured for gathering low voltage electricity from the sediment. The system embodiment may further include a flyback converter for converting the low voltage electricity into secondary DC electricity. The system embodiment may further include a battery for selectively storing the primary and the secondary DC electricity.

Advantages of the present invention over conventional systems for providing underwater power generation include: (1) operation at deeper depths greater than surface turbines, e.g., at least up to 15 m depth, (2) providing power in low flow environments where alternative turbines cannot operate, (3) by operating in low flow environments, MFC 400 power can be employed to provide a secondary power resource, (4) in the event the HK turbine 200 loses function the MFC 400 may still power electronics over time, and (5) similarly, if the MFC 400 loses functionality the HK turbine 200 will still power electronics over time. In summary the underwater power generation system 100 of the present invention provides a more reliable power generation system because of its dual power source technology.

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Finally, terms of degree such as "substantially", "about" and "approximately" as used herein mean a reasonable amount of deviation of the modified term such that the end result is not significantly changed.

From the above description of the inventive underwater power generation system 100 including HK turbine 200 and MFC 400, it is manifest that various alternative structures may be used for implementing features of the present invention without departing from the scope of the claims. For example, and not by way of limitation, embodiments of system 100 may comprise a HK turbine 200 without a MFC 400 and vice versa. The described embodiments are to be considered in all respects as illustrative and not restrictive. It will further be understood that the present invention may suitably comprise, consist of, or consist essentially of the component parts, method steps and limitations disclosed herein. The method and/or apparatus disclosed herein may be practiced in the absence of any element that is not specifically claimed and/or disclosed herein.

While the foregoing advantages of the present invention are manifested in the detailed description and illustrated embodiments of the invention, a variety of changes can be made to the configuration, design, and construction of the invention to achieve those advantages. Hence, reference herein to specific details of the structure and function of the present invention is by way of example only and not by way of limitation.

What is claimed is:

1. An underwater power generation system, comprising:
   a hybrid hydro-kinetic (HK) turbine;
   a shaft rotationally coupled to the HK turbine, the shaft having an axis of rotation;
   a generator rotationally coupled to the shaft for generating alternating current (AC) electricity;
   an electronics module for converting the AC electricity into direct current (DC) electricity;
   a battery for storing the DC electricity;
   a base frame configured to support the HK turbine, the shaft, the generator, the electronics module and the battery on a seafloor or riverbed with the axis of rotation perpendicular to the seafloor or the riverbed;
   a microbial fuel cell (MFC) with at least one anode affixed to a bottom of the base frame and configured to rest in anoxic conditions in sediment and at least one cathode attached to the base frame above the sediment, the MFC in communication with the battery via the electronics module.

2. The underwater power generation system according to claim 1, further comprising a water-tight housing for containing and protecting the generator, the electronics module and the battery.

3. The underwater power generation system according to claim 1, wherein the hybrid HK turbine comprises a plurality of Savonius C foils surrounded by a plurality of Darrieus helical foils arranged to provide rotation to the shaft under low flow conditions on the seafloor or the riverbed.

4. The underwater power generation system according to claim 3, wherein the plurality of Savonius C foils comprises two vertically stacked and orthogonally oriented Savonius C foils.

5. The underwater power generation system according to claim 3, wherein the plurality of Darrieus helical foils comprise three Darrieus helical foils arranged in a 120° phased relationship to one another.

6. The underwater power generation system according to claim 4, further comprising a top plate, an intermediate plate and a bottom plate, wherein the two vertically stacked and orthogonally oriented Savonius C foils are disposed between the top and the bottom plates and the intermediate plate is disposed between the two vertically stacked and orthogonally oriented Savonius C foils.

7. The underwater power generation system according to claim 1, further comprising a gearbox connected between the shaft and the generator for increasing rotational speed provided by the shaft to the generator.

8. The underwater power generation system according to claim 1, wherein the electronics module converts the output of the generator into direct current (DC) electricity suitable for charging the battery.

9. The underwater power generation system according to claim 1, wherein the MFC further comprises a flyback converter for conditioning the electrical output of the MFC into direct current (DC) electricity for charging the battery.

10. The underwater power generation system according to claim 1, wherein the MFC further comprises a plurality of horizontal surface and vertical blade anodes configured to rest on or within the sediment.

11. The underwater power generation system according to claim 1, wherein the base frame has a cross-shaped cross-section perpendicular to the axis of rotation, wherein each arm of the cross extends from a central cavity configured for securing a water-tight housing for containing and protecting the generator, the electronics module and the battery.

12. The underwater power generation system according to claim 11, wherein each of the arms includes a foot at a bottom end, the feet configured to rest in sediment on the seafloor or the riverbed.

13. A method of generating electricity underwater, comprising:
   providing an underwater power generation system, the system comprising:
   a base frame;
   a hybrid hydro-kinetic (HK) turbine;
   a shaft rotationally coupled to the HK turbine, the shaft having an axis of rotation;
   a generator rotationally coupled to the shaft for generating alternating current (AC) electricity;
   an electronics module in communication with the generator and configured to convert the AC electricity into primary direct current (DC) electricity;
   a microbial fuel cell (MFC) with at least one anode affixed to a bottom of the base frame and configured to rest in anoxic conditions in sediment and at least one cathode affixed to the base frame above the sediment, the MFC in communication with the electronics module and configured for gathering secondary DC electricity;

a battery in communication with the electronics module and configured for storing the primary and the secondary DC electricity; and the base frame configured to support the HK turbine, the shaft, the generator, the electronics module, the MFC and the battery on a seafloor or riverbed with the axis of rotation perpendicular to the seafloor or the riverbed;

placing the underwater power generation system on the seafloor or the riverbed at a location exhibiting low flow water moving horizontally through the HK turbine with the MFC resting on or in the sediment;

the low flow water rotating the HK turbine and the shaft;

the generator generating AC electricity;

the electronics module converting the AC electricity to the primary DC electricity; and the primary DC electricity charging the battery.

14. The method of generating electricity underwater according to claim 13, further comprising:
the MFC gathering low voltage electricity from the sediment;
the MFC converting the gathered low voltage electricity into the secondary DC electricity; and
the secondary DC electricity charging the battery.

15. The method of generating electricity underwater according to claim 14, wherein the MFC further comprises a flyback converter for converting the gathered low voltage DC electricity into the secondary DC electricity.

16. The method of generating electricity underwater according to claim 13, wherein the MFC further comprises a plurality of horizontally oriented surface anodes and vertically oriented anodes configured to rest on or within the sediment.

17. The method of generating electricity underwater according to claim 13, wherein the hybrid HK turbine comprises two Savonius C foils surrounded by three Darrieus helical foils, wherein all of the foils are arranged to provide rotation to the shaft under low flow conditions during operation on the seafloor or the riverbed.

18. The method of generating electricity underwater according to claim 13, wherein the base frame further comprises a 3-dimensional cross-shape with four arms, each arm extending outward from a central cavity, and extending upward toward the HK turbine from a bottom end of the base frame, the central cavity configured for holding a water-tight housing for containing and protecting the generator, the electronics module and the battery.

19. A renewable energy underwater power generation system, the system comprising:
a hydro-kinetic (HK) turbine;
a shaft driven by the HK turbine, the shaft having an axis of rotation;
a gearbox driven by the shaft for increasing rotational speed of the shaft;
a generator driven by the gearbox outputting alternating current (AC) electricity;
an electronics module converting the AC electricity into primary direct current (DC) electricity;
a base frame supporting the HK turbine, the shaft, the generator, the gearbox, the electronics module and the battery on a seafloor or riverbed with the axis of rotation perpendicular to the seafloor or the riverbed;
a microbial fuel cell (MFC) with at least one anode affixed to a bottom of the base frame for placement on or within sediment on the seafloor or the riverbed and at least one cathode affixed to the base frame above the sediment, the MFC configured for gathering low voltage electricity from the sediment;
a flyback converter for converting the low voltage electricity into secondary DC electricity; and
a battery for selectively storing the primary and the secondary DC electricity.

* * * * *